(12) United States Patent
Hansteen et al.

(10) Patent No.: US 8,077,546 B2
(45) Date of Patent: Dec. 13, 2011

(54) METHOD FOR MONITORING A MULTI-LAYERED SYSTEM

(75) Inventors: Fredrik Hansteen, Leiden (NL); Peter Berkeley Wills, Calgary (NL)

(73) Assignee: Shell Oil Company, Houston, TX (US)

( * ) Notice: Subject to any disclaimer, the term of this patent is extended or adjusted under 35 U.S.C. 154(b) by 217 days.

(21) Appl. No.: 12/435,040

(22) Filed: May 4, 2009

(65) Prior Publication Data
US 2009/0274005 A1 Nov. 5, 2009

(30) Foreign Application Priority Data
May 5, 2008 (EP) .................................... 08155625

(51) Int. Cl.
*G01V 1/30* (2006.01)
(52) U.S. Cl. ................. 367/36; 367/25; 367/57; 702/11
(58) Field of Classification Search ............. 367/36, 367/57; 702/11, 14
See application file for complete search history.

(56) References Cited

U.S. PATENT DOCUMENTS

| | | | | |
|---|---|---|---|---|
| 6,128,581 A | * | 10/2000 | Zhang | 702/18 |
| 6,684,159 B2 | * | 1/2004 | Khan et al. | 367/57 |
| 2004/0076077 A1 | * | 4/2004 | Robertsson et al. | 367/15 |
| 2006/0285439 A1 | * | 12/2006 | Haugland | 367/75 |

FOREIGN PATENT DOCUMENTS
WO WO 92/12444 * 7/1992

OTHER PUBLICATIONS

J. Ivanov et al., "Time lapse seismic study of levees in southern New Mexico", SEG Expanded Abstracts/ New Orleans 2006, Annual Meeting, pp. 3255-3259, XP002498902.

M. Landro et al., "Time lapse refraction seismic—a tool for monitoring carbonate fields" SEG Expanded Abstracts, SEG 74th Annual Meeting/Denver 2004, pp. 1-4, XP002498903.

L.R. Lines et al., "Seismic Velocity Models for Heat Zones in Athabasca Tar Sands" Geophysics, SEG, vol. 55, No. 8, Aug. 1990, pp. 1108-1111, XP002498904.

M. J. Friedel et al. "Tomographic Imaging of Coal Pillar Conditions: Observations and Implications" Int. J. Rock Mech. Min. SCI. & GEOMECH. ABSTR., vol. 33, No. 3, 1996, pp. 279-290, XP002498906.

* cited by examiner

*Primary Examiner* — Ian Lobo

(57) ABSTRACT

A method for monitoring a multi-layered system below a surface comprising a slow layer and a fast layer; the method comprising: transmitting one or more seismic waves from one or more seismic sources through the multi-layered system; receiving signals emanating from the multi-layered system in response to the one or more seismic waves with one or more receivers located a distance from the one or more seismic sources; identifying one or more critically refracted compressional (CRC) waves amongst the signals; and inferring information about a change in the slow layer based on the one or more CRC waves; wherein the CRC wave is a refracted wave which has traveled along an interface between the fast layer and an adjacent layer.

10 Claims, 4 Drawing Sheets

Finite difference synthetic - geophones at surface then downward continued to 550m

METHOD FOR MONITORING A MULTI-LAYERED SYSTEM

FIELD OF INVENTION

The present invention relates to a method for monitoring a multi-layered system comprising a slow layer and a fast layer which utilizes refracted waves.

BACKGROUND OF THE INVENTION

Gas and oil reservoirs usually can be found in sedimentary rocks, which generally represent a set of high and low velocity contacting layers. Reservoir surveillance during production is a key to meeting goals of reduced operating costs and maximized recovery. Time-lapse seismic methods are well known method for monitoring changes in the reservoir during production. Seismic velocity and density changes in a producing reservoir depend on rock type, fluid properties, and the depletion mechanism. Time-lapse seismic responses may be caused by changes in reservoir saturation, pore fluid pressure changes during fluid injection or depletion, fractures, and temperature changes.

Enhanced oil recovery (EOR) is a general term used for increasing the amount of oil that can be extracted from a reservoir. EOR techniques include but are not limited to gas injection, thermal recovery (e.g. steam injection or steam flooding), and chemical injection. Areal field monitoring of EOR processes and other reservoir events has proven very successful as an aid to understanding the sometimes complex behavior of producing reservoirs. Seismic and other monitoring methods such as passive microseismic monitoring, satellite imagery and material balance calculations can all contribute to an integrated understanding of the reservoir changes.

A current method for providing a detailed picture of reservoir changes is surface seismic imaging, but there are difficulties associated with the method. An example of such a method is discussed in U.S. Pat. No. 6,717,867 which is hereby incorporated by reference. In surface seismic imaging methods, data quality can have enormous variations from field to field for various reasons including statics (which can vary from season to season) and multiples and reverberations which can dominate primary energy. Generally, stacking of high fold data is necessary to overcome these problems, but often even this stacking does not give sufficient signal-to-noise-ratio for EOR monitoring. Another difficulty with surface seismic monitoring is its high cost, especially on land. To monitor a land EOR operation that extends over approximately 50 square kilometres with a resolution of approximately 20 meters requires a huge investment in seismic operations. Ultimately, this huge expense can be attributed to the high fold required to achieve acceptable signal-to-noise levels.

Time lapse refraction seismology was first suggested as an alternative method for measuring changes in carbonate reservoirs. See Tatanova, Maria, Bakulin, Andrey, Kashtan, Boris, Korneev, Valeri, (2007), "Head-wave monitoring with virtual sources", 77th Annual International Meeting, SEG, Expanded Abstracts, 2994-2998 (hereby incorporated by reference). According to this method, a seismic source is positioned somewhere above a reservoir (with higher compressional velocity than the surrounding rocks). The seismic source shoots into a geophone array and a crtitically refracted compressional (CRC) wave forms along the boundary of the reservoir and the overlying formation. The change in velocity of the head wave on the reservoir fluids and reservoir changes are easily detectable as time shifts in the seismic traces. One drawback of this method is that it requires a fast reservoir. Often the reservoir is a relatively slow rock surrounded by faster rocks and so this method cannot be used as it was originally conceived.

There is a need to develop a cost efficient method for monitoring a multi-layered system as it undergoes EOR operations and other reservoir changes.

SUMMARY OF THE INVENTION

The present invention includes a method for monitoring a multi-layered system below a surface comprising a slow layer and a fast layer; the method comprising: transmitting one or more seismic waves from one or more seismic sources through the multi-layered system; receiving signals emanating from the multi-layered system in response to the one or more seismic waves with one or more receivers located a distance from the one or more seismic sources; identifying one or more critically refracted compressional (CRC) waves amongst the signals; and inferring information about a change in the slow layer based on the one or more CRC waves; wherein the CRC wave is a refracted wave which has traveled along an interface between the fast layer and an adjacent layer.

BRIEF DESCRIPTION OF THE DRAWINGS

The present invention is better understood by reading the following description of non-limitative embodiments with reference to the attached drawings, wherein like parts of each of the figures are identified by the same reference characters, and which are briefly described as follows.

DETAILED DESCRIPTION

In the specification and in the claims, the term 'fast' is used to describe a rock layer with a seismic velocity greater than approximately 4000 meters per second (e.g. carbonates). In this specification, the fast layer is also referred to as the refracting layer. The term 'slow' is used to describe a rock layer with a seismic velocity, which is slower than the seismic velocities of the neighboring rock layers. In this specification the slow layer is also referred to as the reservoir layer. The term 'crtitically refracted compressional wave' is used to describe a seismic wave travelling through a multi-layered system containing at least one slow and at least one fast layer. CRC waves may also be referred to as head waves, diving waves, or refracted waves. A CRC wave is usually a first arrival wave as it travels longer paths through rocks of higher seismic velocities. The term 'first arrival' is used to describe the first seismic event recorded on a seismogram. The term 'total depth' is used to describe the maximum depth reached in a well.

Figure 1:
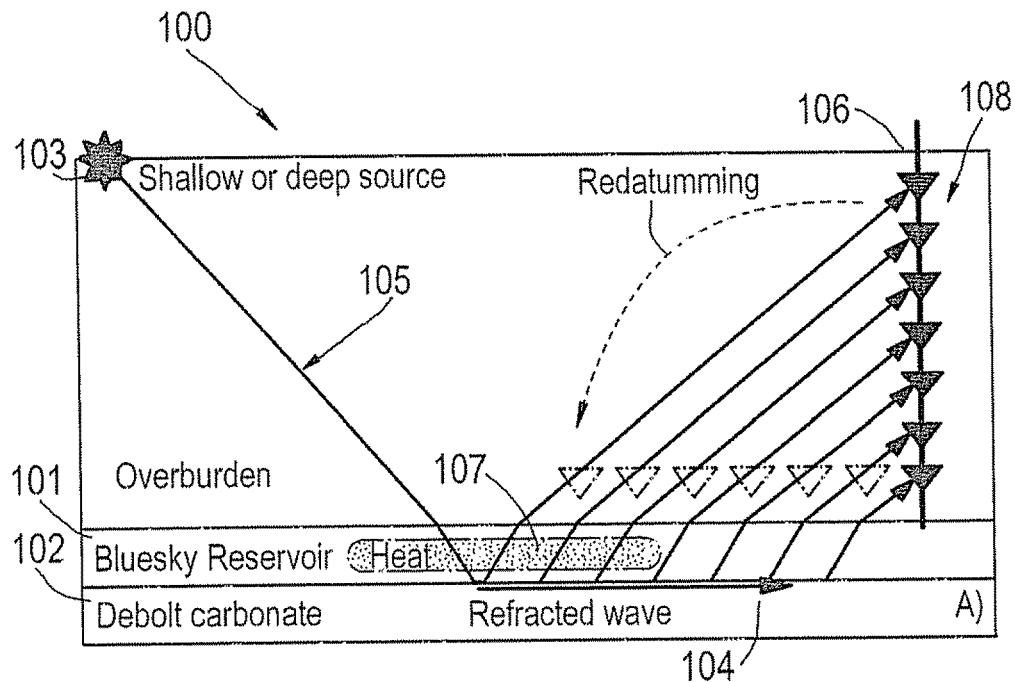
FIG. 1 shows a schematic view of a rock model in which the method of the present invention is applied.

In FIG. 1, a rock model 100 that describes the geology of many oil fields is shown. In this figure, a slow layer (reservoir layer) 101 is shown with an underlying fast layer (refracting layer) 102; however this configuration is only one example of a particular rock model. The fast layer does not need to be immediately below the slow layer. It could, for example, be situated significantly deeper in the earth. When an active or passive seismic source 103 is excited the CRC wave 104 travels along the interface between fast layer 102 and slow layer 101 and exits at some lateral position that is related to the relative velocity of the reservoir and underlying fast layer 102. In the situation where the fast layer does not lie directly beneath the slow layer, the CRC wave travels along an interface between the fast layer and the adjacent layer. A geophone array 106 placed in a monitoring well 108 measures the received signals. The first arrivals seen on the geophones provide good lateral resolution of the progressing steam front 107 or other EOR processes or reservoir changes. Although the figure shows a buried source shooting into a neighboring vertical well 105, the method is perfectly feasible with deviated wells with surface sources and receivers, and other configurations. The method may also be applied in an offshore environment using hydrophones instead of geophones. Additionally the geophones or hydrophones may be placed in different configurations or other measurement methods may be used as alternatives.

Figure 2:
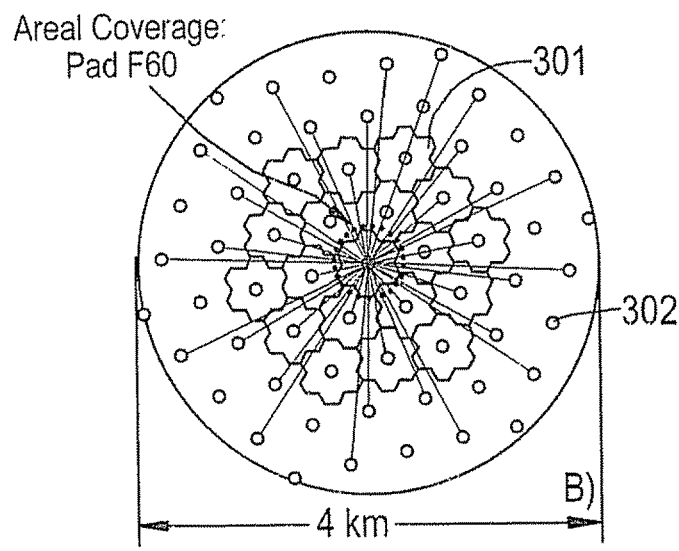
FIG. 2 shows a graph illustrating reach of refraction imaging from a wellbore.

In an embodiment, where a surface seismic source shoots into a buried vertical array of geophones, the source should be far enough from the geophones that the CRC wave has a viable propagation path. A fine lateral sampling of the reservoir can be obtained by choosing a correspondingly fine sampling of the receiver array in the well. The maximum distance imaged from a particular well is fixed by the critical angle and the vertical extent of the geophone array. FIG. 2 illustrates the imaged distance from the wellbore plotted against depth of the geophone. This shows that deeper geophones, nearer the refracting formation, will image reservoir changes close to the wellbore while shallower geophones will image points farther from the wellbore. Predicted "reach" for a real field with reservoir depth of approximately 550 meters, a carbonate underlying sandstone, based on ray tracing through a well log model, is shown in FIG. 2 and this is shown to be approximately 400 meters. However this is just an approximation and this method should not be limited by the figure. If this acquisition is performed in a time-lapse mode, then a measurement of heat (or other EOR-related) change along the 2D section fixed by the source and well positions can be made. The result is, for a single shot and a receiver array in a vertical well, a single line of time-shift measurements emanating (in plan view) from the well. In another example, with surface sources and a line of receivers at the surface, the time-shift measurements obtained from a single source would be along a line parallel to the receiver array.

Figure 3:
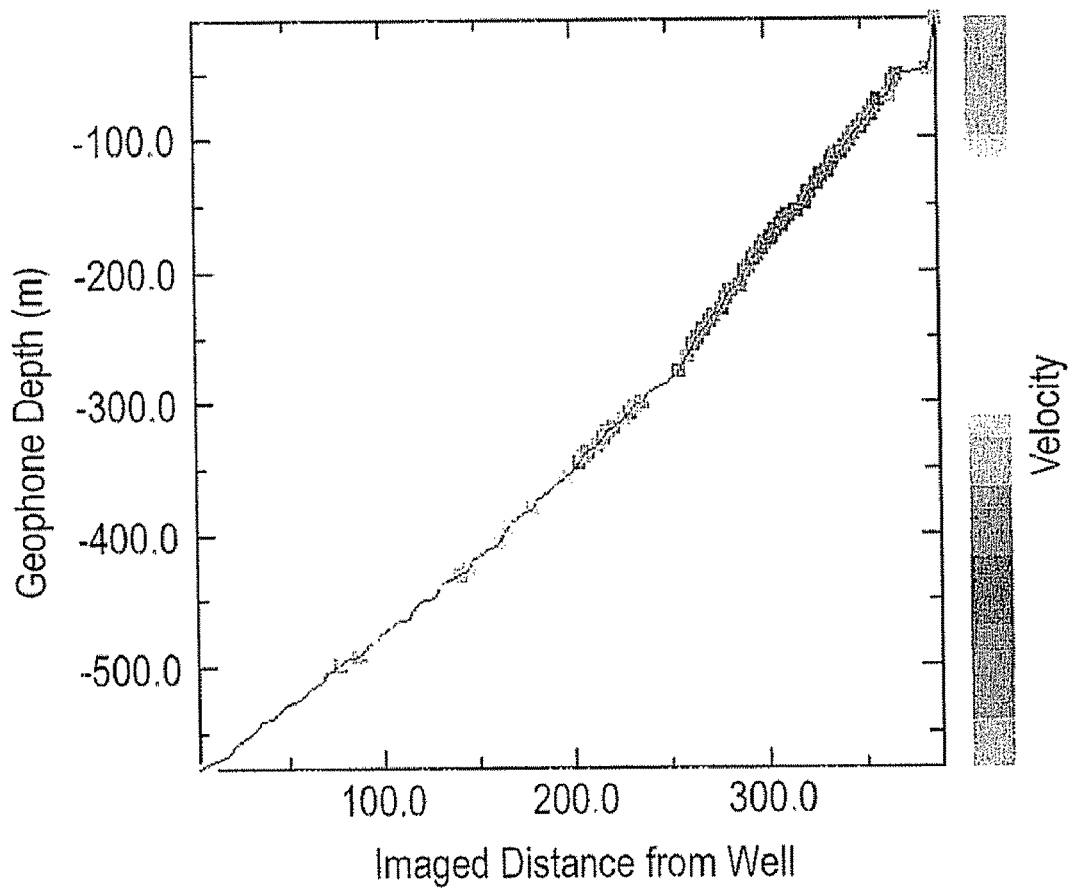
FIG. 3 shows an overhead view of an embodiment of the invention involving multiple wells.

In another embodiment of the invention, the sources may be distributed in an areal fashion. Referring to FIG. 3, a schematic of the up-scaling of the single well monitoring to an entire field. The hexagons 301 in the picture represent a single "unit" of production wells and the dots 302 are the positions of vertical wells containing geophone arrays. The distance between neighboring units 301 is, in this example, approximately 500 meters and this distance can be considered as the repetition length of the well patterns. In the previous section, which treats the same example as pictured in FIG. 3, we estimated a radial reach of approximately 400 meters for a given well which means that if we were to have a vertical geophone array in every unit, the imaged areas would overlap, giving areal coverage if we have a dense enough set of sources. The CRC sources could be placed down-hole, in the same vertical monitor wells. In one embodiment permanently installed sources, which operate continuously are used to give a frequent update on steam progress. The sources may be placed permanently near total depth in the vertical monitor well and recorded into all geophone arrays within range, providing areal field monitoring for the entire field at an incremental cost well below what one would pay for conventional surface seismic monitoring. The down-hole deployment of sources would remove a significant source of noise remaining for this method—near surface statics, keeping in mind that we will be dealing with refraction arrivals uncorrupted by surface waves or multiples.

In this embodiment, the vertical monitor wells may be instrumented with geophone strings having a sampling of approximately 10-20 meters and extending from near the reservoir up to the surface. As each vertical monitor well is drilled, one or more sources will be installed near total depth, or provisions will be made for other surface or downhole sources such as, but not limited to, dynamite, vibroseis sparket, vibrator or airgun. During the life of the field, the resulting seismic data will provide, via vertical travel time changes through the reservoir, an image of steam front progress with areal coverage and good lateral resolution. Some idea of vertical steam conformance can also be obtained from magnitudes of time shifts and the use of permanent, continuous sources can make this technique of very high resolution in time.

In another embodiment, alternatives to buried sources may be used to reduce the harmful effects of statics time shifts. For example, in the areal monitoring with vertical wells example, the statics could be corrected by demanding that the time-lapse time shifts agree for all of the raypaths associated with one receiver well, at the geophone at the bottom of the well. For a multi-well setup where the reservoir is changing on both shot and receiver side, the method could employ simultaneously solving for shot and receiver side time shifts over the whole field.

In one example, CRC waves were modelled using an elastic finite difference modelling package. The elastic wave equation was used in part because much of the propagation modelled is along the sedimentary bed direction and glancing-angle rays will be important. The frequency was taken only to 100 Hz (to save modelling time) although there would be no such constraint in the field data. The earth model is taken as layered with geometry as specified above, with the layers being defined by the well logs from a producing oil field. The geometry of the modelling is shown FIGS. 5 and 6 (right side) where the layered model was changed by filling up the entire reservoir with low velocity to represent heat, keeping Vp/Vs constant. The grid spacing was 1.5 meters. Compressional velocity was taken as 1900 m/s when steam was present and Vp/Vs was taken as 2 everywhere in the reservoir, with and without steam. For this synthetic, the transition between presence and absence of steam was smoothed over 50 meters.

Figure 4:
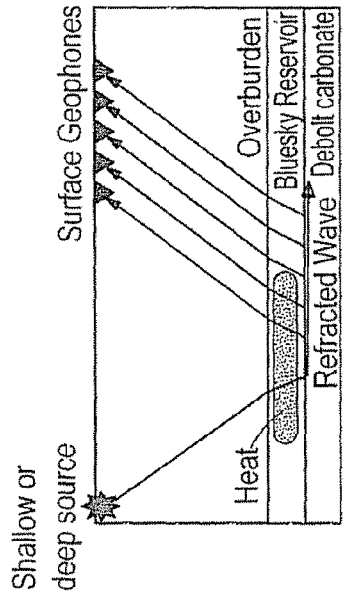
FIG. 4 shows a model of seismic data according to the invention.
Figure 4:
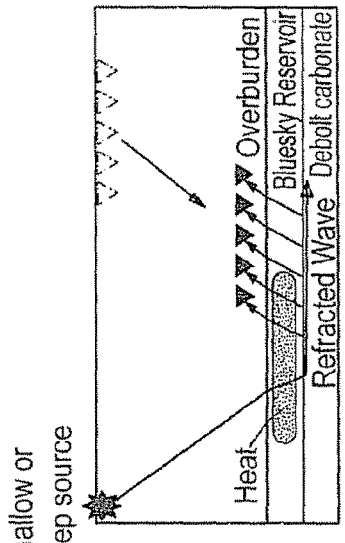
Figure 5:
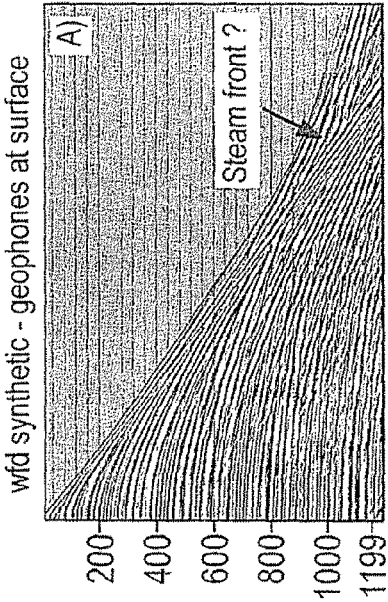
FIG. 5 shows another model of seismic data according to the invention.
Figure 5:
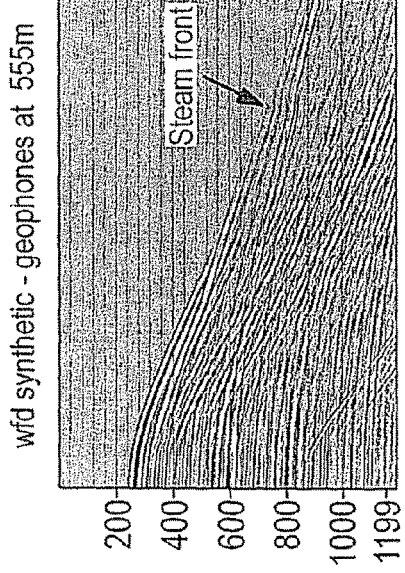

In FIG. 4, the seismic data are shown as recorded on the surface and in FIG. 5, they are shown recorded into a horizontal string right above the reservoir. The deep geometry is obviously superior in that the steam front is clear as a kink in the first-arrival wavefield while the surface geometry produces an image that is not immediately interpretable. Because deep geophones are expensive, it is desirable to numerically continue the surface wavefield down to the reservoir level.

This was accomplished utilizing a Fourier domain, high angle downward continuation, applied in a time migration sense (many algorithms exist for this operation, usually referred to as redatuming). However any known method of migration may also be used.

Figure 6:
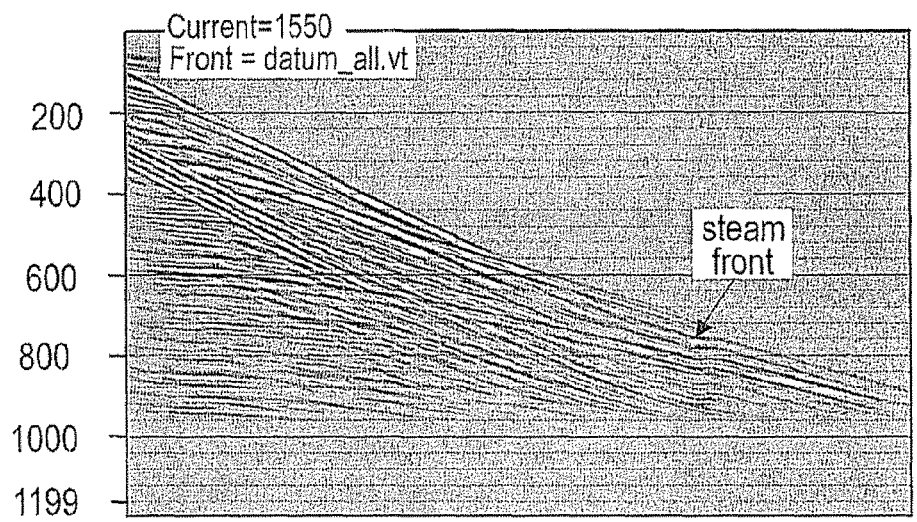
FIG. 6 shows the results of a simulation according to the invention.

As shown in FIG. 6, the result of the continuation is excellent, at least for kinematics and this will be the preferred method for looking at the data. In addition to improvement in signal to noise ratio, the downward continuation also provides a means of improving resolution, in a similar way to migration. So, for the surface geometry, downward continued refraction seismic, because of its first arrival status, provide a suitable method for imaging steam fronts with much less noise than reflection surface seismic data. This difference in noise content may make even surface acquisition of refraction data superior to conventional seismic data in challenging geological conditions.

Figure 7:
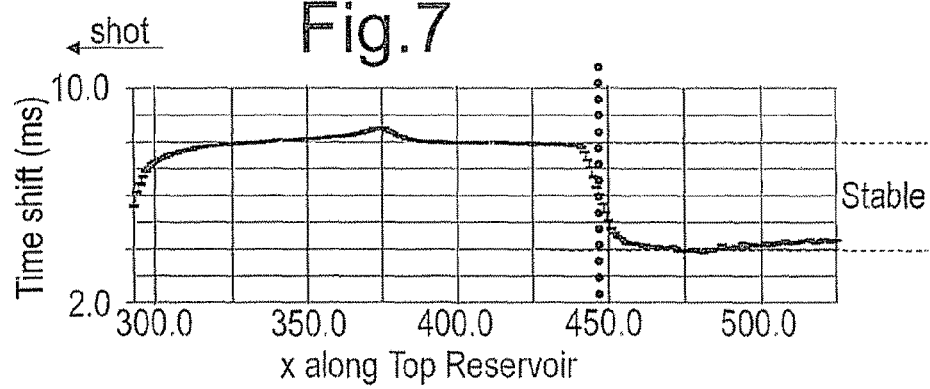
FIG. 7 shows the results of another simulation according to the invention.

The CRC wave travels along an interface between formations with very different velocities. It is generally believed that the CRC wave travels with the velocity of the fast medium; however this may not be true when the CRC wave has finite frequency. If not, then the time shifts will have contributions from points all along the critically refracted part of the raypath and not just from entry and exit point. This would make the interpretation of local time shifts very difficult. The issue is addressed in FIG. 7 where a simulation, with surface shots and geophones just above the top of the reservoir, is analysed. In this simulation, a shot is fired from the surface at x=1, well to the left of the left edge of the figure, using well log rock properties. Receivers are placed just above top reservoir. The reservoir is flooded with steam all the way from the shot to the position of the vertical blue line in the figure. Left of the blue line, the ray passes through the steam zone twice (shot and receiver side) while on the right, it passes through the reservoir only once (shot side). The model has pressure-up where there is no steam.

At the point where the steam in the reservoir terminates, we see a sharp drop in the travel time corresponding to the point where receiver-side rays no longer pass through the reservoir. Away from this point, the time shift is stable and in particular, acquires no significant continuously increasing contribution.

In some situations, the presence of deeper, faster refractors below the reservoir may affect the method. While these deeper refraction events may eventually cross the refraction due to the interface lying directly beneath the reservoir, these deeper events, when downward continued, will put the same time shift as the refractor underlying the reservoir at the same place. A cross-correlation program computing time shifts will not distinguish between the two carbonate layers and will give the same time shift for two layers as it would if only one layer were present. This is another very good reason for including downward continuation in the processing flow.

Figure 8:
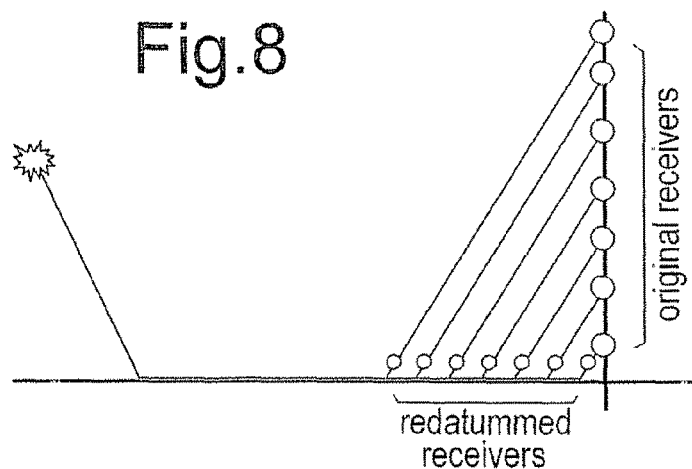
FIG. 8 shows a schematic description of a redatumming operation.

Referring to FIG. 8, simulations where the distant source shoots into a vertical well have also been analysed and they show effects similar to those measured in the surface geometry. In fact, the surface geometry is a "worst case" in the sense that the refracted raypath arrives generally later in time compared to direct and reflection arrivals. Comparison of synthetics where the receivers are placed in a "horizontal well" at top reservoir have been compared to synthetics where the receivers are placed in a vertical well and they show that downward continuation is again required to optimize spatial resolution. In this case, the operation is more properly referred to as redatuming, with the data in the well redatumed into the "horizontal well" lying just above the reservoir as shown in FIG. 8.

Advantages of some embodiments of the invention include but are not limited to:

CRC waves are often first arrivals, giving them better signal to noise ratio.

CRC waves are flexible, allowing areal monitoring methods that can have either surface sources and receivers or either sources or receivers that are in a borehole or otherwise buried.

CRC waves are usable with low fold acquisition making the method very cost-effective.

The wavelet in a CRC wave is not corrupted by reverberation noise making it easy to use for detailed studies such as dispersion measurements.

CRC waves are synergistic with other seismic methods which may lead to cheap, high resolution and areally extensive field monitoring.

Those of skill in the art will appreciate that many modifications and variations are possible in terms of the disclosed embodiments, configurations, materials, and methods without departing from their spirit and scope. Accordingly, the scope of the claims appended hereafter and their functional equivalents should not be limited by particular embodiments described and illustrated herein, as these are merely exemplary in nature and elements described separately may be optionally combined.

The invention claimed is:

1. A method for monitoring a multi-layered system in a subsurface formation that includes a slow layer and a fast layer; the method comprising:
 a) providing a set of signals obtained by:
  i) transmitting one or more seismic waves from one or more seismic sources through the multi-layered system; and
  ii) receiving signals emanating from the multi-layered system in response to the one or more seismic waves with one or more receivers located a distance from the one or more seismic sources;
  wherein at least one of said seismic sources and receivers is in a well;
 b) identifying among the received signals at least one critically refracted compressional (CRC) wave that has traveled along an interface between the fast layer and an adjacent layer;
 c) performing steps a) and b) in a time-lapse mode so as to obtain at least two CRC waves;
 d) inferring information about a change in the slow layer based on the at least two CRC waves; and
 e) imaging the information from step d).

2. The method of claim 1 wherein the adjacent layer is the slow layer.

3. The method of claim 1, further comprising:
 f) performing a source and/or receiver redatumming of the CRC waves to the slow layer.

4. The method of claim 1 wherein the change in the slow layer comprises a movement of steam, heat pressure, fracturing, temperature, oil saturation, gas saturation, or chemicals within the slow layer.

5. The method of claim 1 wherein the one or more seismic sources are located in a first well traversing the multi-layered system.

6. The method of claim 5 wherein the one or more receivers are an array of geophones or hydrophones.

7. The method of claim 5 wherein the one or more receivers are located in a second well traversing a portion the multi-layered system.

8. The method of claim 7 wherein the first well and second well are located offshore.

9. The method of claim 5 wherein the one or more receivers are located on the surface.

10. The method of claim 1 wherein the one or more seismic sources are located on the surface.

* * * * *